US011503606B2

(12) United States Patent
Toeda et al.

(10) Patent No.: US 11,503,606 B2
(45) Date of Patent: Nov. 15, 2022

(54) BASE STATION DEVICE

(71) Applicant: NTT DOCOMO, INC., Tokyo (JP)

(72) Inventors: Teruaki Toeda, Tokyo (JP); Anil Umesh, Tokyo (JP); Hiromasa Umeda, Tokyo (JP); Yousuke Sano, Tokyo (JP); Akihito Hanaki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 21 days.

(21) Appl. No.: 16/763,051

(22) PCT Filed: Nov. 17, 2017

(86) PCT No.: PCT/JP2017/041575
§ 371 (c)(1),
(2) Date: May 11, 2020

(87) PCT Pub. No.: WO2019/097706
PCT Pub. Date: May 23, 2019

(65) Prior Publication Data
US 2020/0396740 A1    Dec. 17, 2020

(51) Int. Cl.
*H04W 72/04* (2009.01)
*H04W 56/00* (2009.01)
*H04W 92/20* (2009.01)

(52) U.S. Cl.
CPC ..... *H04W 72/0493* (2013.01); *H04W 56/001* (2013.01); *H04W 72/0446* (2013.01); *H04W 72/0453* (2013.01); *H04W 92/20* (2013.01)

(58) Field of Classification Search
CPC .............. H04L 25/0226; H04W 76/11; H04W 72/1273; H04W 76/27; H04W 56/00;
(Continued)

(56) References Cited

U.S. PATENT DOCUMENTS 10,750,410 B2 *  8/2020  Vrzic ............... H04W 36/0016
2013/0210445 A1   8/2013  Nakamura et al.
(Continued)

FOREIGN PATENT DOCUMENTS

EP    0 917 321 A1    5/1999
JP    H11-234204 A    8/1999
(Continued)

OTHER PUBLICATIONS

International Search Report issued in PCT/JP2017/041575 dated Dec. 19, 2017 (5 pages).
(Continued)

*Primary Examiner* — Iqbal Zaidi
(74) *Attorney, Agent, or Firm* — Osha Bergman Watanabe & Burton LLP

(57) ABSTRACT

Disclosed is a second base station device communicating with a first base station device. The second base station device includes a receiver configured to receive, from the first base station device, information for limiting radio resource allocation; a controller configured to allocate a radio resource based on the received information for limiting radio resource allocation; and a transmitter configured to transmit information for limiting radio resource allocation to the first base station device. The information for limiting radio resource allocation includes information indicating at least one of a frequency domain and a time domain indicating a location of a radio resource.

6 Claims, 22 Drawing Sheets

(58) Field of Classification Search
CPC ........... H04W 72/0413; H04W 56/005; H04W 76/16
See application file for complete search history.

(56) References Cited

U.S. PATENT DOCUMENTS

| | | | |
|---|---|---|---|
| 2013/0223401 A1 | 8/2013 | Kitahara | |
| 2013/0329612 A1 | 12/2013 | Seo et al. | |
| 2015/0043546 A1 | 2/2015 | Nakamura et al. | |
| 2019/0261235 A1* | 8/2019 | Yilmaz | H04W 36/0033 |
| 2020/0059985 A1* | 2/2020 | Henttonen | H04W 76/11 |

FOREIGN PATENT DOCUMENTS

| | | |
|---|---|---|
| JP | 2003-259414 A | 9/2003 |
| JP | 2013-546230 A | 12/2013 |
| WO | 2011/129448 A1 | 10/2011 |
| WO | 2012/063837 A1 | 5/2012 |

OTHER PUBLICATIONS

Written Opinion of the International Searching Authority issued in PCT/JP2017/041575 dated Dec. 19, 2017 (10 pages).
3GPP TS 37.340 V1.2.0; "3rd Generation Partnership Project; Technical Specification Group Radio Access Network; Evolved Universal Terrestrial Radio Access (E-UTRA) and NR; Multi-connectivity; Stage 2 (Release 15)"; Oct. 2017 (50 pages).
3GPP TS 38.300 V1.2.1; "3rd Generation Partnership Project; Technical Specification Group Radio Access Network; NR; NR and NG-RAN Overall Description; Stage 2 (Release 15)"; Nov. 2017 (56 pages).
Notice of Reasons for Refusal issued in Japanese Application No. 2019-553656, dated Mar. 16, 2021 (8 pages).
Extended European Search Report in counterpart European Application No. 17931977.7 dated May 26, 2021 (10 pages).
NTT Docomo, Inc.; "How to avoid IMD issue with dual transmission overX2"; 3GPP TSG-RAN WG3 #98, R3-174842; Reno, NV, USA; Nov. 27-Dec. 1, 2017 (50 pages).
Office Action issued in the counterpart Japanese Patent Application No. 2021-147441, dated Aug. 16, 2022 (5 pages).

* cited by examiner

FIG.6

SGNB ADDITION REQUEST     Direction: MeNB → SgNB

| IE/Group Name | Presence | Range | IE type and reference | Semantics description | Criticality | Assigned Criticality |
|---|---|---|---|---|---|---|
| eNB Resource Allocation | O | | 9.2.bb | | YES | reject |

SGNB ADDITION REQUEST ACKNOWLEDGE     Direction: SgNB → MeNB

| IE/Group Name | Presence | Range | IE type and reference | Semantics description | Criticality | Assigned Criticality |
|---|---|---|---|---|---|---|
| gNB Resource Allocation | O | | 9.2.cc | | YES | reject |

FIG.8

SGNB MODIFICATION REQUEST  Direction: MeNB → SgNB

| IE/Group Name | Presence | Range | IE type and reference | Semantics description | Criticality | Assigned Criticality |
|---|---|---|---|---|---|---|
| eNB Resource Allocation | O | | 9.2.bb | | YES | reject |

SGNB MODIFICATION REQUEST ACKNOWLEDGE  Direction: SgNB → MeNB

| IE/Group Name | Presence | Range | IE type and reference | Semantics description | Criticality | Assigned Criticality |
|---|---|---|---|---|---|---|
| gNB Resource Allocation | O | | 9.2.cc | | YES | reject |

FIG.10

SGNB MODIFICATION REQUIRED      Direction: SgNB → MeNB

| IE/Group Name | Presence | Range | IE type and reference | Semantics description | Criticality | Assigned Criticality |
|---|---|---|---|---|---|---|
| gNB Resource Allocation | O | | 9.2.cc | | YES | reject |

SGNB MODIFICATION CONFIRM      Direction: MeNB → SgNB

| IE/Group Name | Presence | Range | IE type and reference | Semantics description | Criticality | Assigned Criticality |
|---|---|---|---|---|---|---|
| eNB Resource Allocation | O | | 9.2.bb | | YES | reject |

FIG.11

9.2.bb eNB Resource Allocation

| IE/Group Name | Presence | Range | IE type and reference | Semantics description |
|---|---|---|---|---|
| eNB Resource Allocation | M | | | |
| >Cell Information Item | | 1 .. ⟨maxCellineNB⟩ | | |
| >>Resource Allocation Optimization Request | O | | ENUMERATED (start, stop) | Type of request which resource allocation optimization is required. |
| >>DL Potential allocated resource | O | | BIT STRING (6..4400, ...) | Each position in the bitmap represents ... |
| >>UL Potential allocated resource | O | | BIT STRING (6..4400, ...) | Each position in the bitmap represents ... |
| >>CHOICE EUTRA-Mode-Info | O | | | |
| >>>FDD | | | | |
| >>>>FDD Info | | 1 | .. | .. |
| .. | .. | | | |
| >>>TDD | | | | |
| >>>>TDD Info | | 1 | .. | .. |
| >>>>Special Subframe Info | | 1 | | Special subframe configuration information defined in TS 36.211 [10]... |
| .. | .. | | .. | .. |

FIG.12

9.2.cc gNB Resource Allocation

| IE/Group Name | Presence | Range | IE type and reference | Semantics description |
|---|---|---|---|---|
| gNB Resource Allocation | M | | | |
| >Cell Information Item | | 1 .. <maxCellineNB> | | |
| >>Resource Allocation Optimization Request | O | | ENUMERATED (start, stop) | Type of request which resource allocation optimization is required. |
| >>DL Potential allocated resource | O | | BIT STRING (6.4400, ...) | Each position in the bitmap represents ... |
| >>UL Potential allocated resource | O | | BIT STRING (6.4400, ...) | Each position in the bitmap represents ... |
| >>CHOICE EUTRA-Mode-Info | O | | | |
| >>>FDD | | 1 | | |
| >>>>FDD Info | | | ... | ... |
| >>>TDD | | 1 | | |
| >>>>TDD Info | | | ... | ... |
| >>>>>Special Subframe Info | | 1 | | Special subframe configuration information defined in TS 36.211 [10]... |
| | | | ... | ... |

FIG.15

UE CONTEXT SETUP REQUEST    Direction: gNB-CU → gNB-DU

| IE/Group Name | Presence | Range | IE type and reference | Semantics description | Criticality | Assigned Criticality |
|---|---|---|---|---|---|---|
| eNB Resource Allocation | O | | 9.3.2.XX | Same definition as in TS 36.423 [X] | | |

UE CONTEXT SETUP RESPONSE    Direction: gNB-DU → gNB-CU

| IE/Group Name | Presence | Range | IE type and reference | Semantics description | Criticality | Assigned Criticality |
|---|---|---|---|---|---|---|
| gNB Resource Allocation | O | | 9.3.2.YY | Same definition as in TS 36.423 [X] | | |

FIG.17

UE CONTEXT MODIFICATION REQUEST  Direction: gNB-CU → gNB-DU

| IE/Group Name | Presence | Range | IE type and reference | Semantics description | Criticality | Assigned Criticality |
|---|---|---|---|---|---|---|
| eNB Resource Allocation | O | | 9.3.2.XX | Same definition as in TS 36.423 [X] | | |

UE CONTEXT MODIFICATION RESPONSE  Direction: gNB-DU → gNB-CU

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| gNB Resource Allocation | O | | 9.3.2.YY | Same definition as in TS 36.423 [X] | | |

FIG.19

UE CONTEXT MODIFICATION REQUIRED    Direction: gNB-DU → gNB-CU

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| gNB Resource Allocation | O | | 9.3.2.YY | Same definition as in TS 36.423 [X] | | |

UE CONTEXT MODIFICATION CONFIRM    Direction: gNB-CU → gNB-DU

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU UE F1AP ID | M | | 9.3.1.4 | | YES | reject |
| gNB-DU UE F1AP ID | M | | 9.3.1.5 | | YES | reject |
| eNB Resource Allocation | O | | 9.3.2.XX | Same definition as in TS 36.423 [X] | | |

FIG.20

9.3.2.XX eNB Resource Allocation

| IE/Group Name | Presence | Range | IE type and reference | Semantics description |
|---|---|---|---|---|
| eNB Resource Allocation | M | | | |
| >Cell Information Item | | 1 .. <maxCellineNB> | | |
| >>Resource Allocation Optimization Request | O | | ENUMERATED (start, stop) | Type of request which resource allocation optimization is required. |
| >>DL Potential allocated resource | O | | BIT STRING (6..4400, ....) | Each position in the bitmap represents ... |
| >>UL Potential allocated resource | O | | BIT STRING (6..4400, ....) | Each position in the bitmap represents ... |
| >>CHOICE *EUTRA-Mode-Info* | O | | | |
| >>>*FDD* | | | | |
| >>>>FDD Info | | 1 | | ... |
| ... | ... | ... | | |
| >>>*TDD* | | | | |
| >>>>TDD Info | | 1 | | ... |
| >>>>Special Subframe Info | | 1 | | Special subframe configuration information defined in TS 36.211 [10] ... |
| ... | ... | ... | | ... |

FIG.21

9.3.2.YY gNB Resource Allocation

| IE/Group Name | Presence | Range | IE type and reference | Semantics description |
|---|---|---|---|---|
| gNB Resource Allocation | | | | |
| >Cell Information Item | M | 1 .. <maxCellineNB> | | |
| >>Resource Allocation Optimization Request | O | | ENUMERATED (start, stop) | Type of request which resource allocation optimization is required. |
| >>DL Potential allocated resource | O | | BIT STRING (6..4400, ....) | Each position in the bitmap represents ... |
| >>UL Potential allocated resource | O | | BIT STRING (6..4400, ....) | Each position in the bitmap represents ... |
| >>CHOICE *EUTRA-Mode-Info* | O | | | |
| >>>*FDD* | | | | |
| >>>>FDD Info | | 1 | | |
| ... | ... | ... | | : |
| >>>*TDD* | | | | |
| >>>>TDD Info | | 1 | | : |
| ... | ... | ... | | |
| >>>>Special Subframe Info | | 1 | | Special subframe configuration information defined in TS 36.211 [10] ... |
| ... | ... | ... | | : |

BASE STATION DEVICE

TECHNICAL FIELD

The present invention relates to a base station device in a radio communication system.

BACKGROUND ART

In the 3GPP (Third Generation Partnership Project), the specification of a new radio communication system called a New Radio Access Technology (NR) system is being developed as a successor to the LTE (Long Term Evolution) system and the LTE-Advanced system (e.g., see NON-PATENT DOCUMENT 1).

In the NR system, similar to the dual connectivity in the LTE system, introduction of technology called LTE-NR dual connectivity or multi RAT (Multi Radio Access Technology) dual connectivity has been discussed (e.g., see NON-PATENT DOCUMENT 2). In such technology called LTE-NR dual connectivity or multi RAT (Multi Radio Access Technology) dual connectivity, data is divided between a base station device (eNB) of the LTE system and a base station device (gNB) of the NR system, and the divided data sets are simultaneously transmitted and received by these base station devices.

RELATED ART DOCUMENTS

Non-Patent Documents

[NON-PATENT DOCUMENT 1] 3GPP TS 38.300 V1.2.1 (2017 November)
[NON-PATENT DOCUMENT 2] 3GPP TS 37.340 V1.2.0 (2017 October)

SUMMARY OF THE INVENTION

Problem to be Solved by the Invention

In LTE-NR dual connectivity, inter-modulation distortion (IMD) and harmonics may occur in two or more uplink transmissions. In this case, the generated IMD and harmonics may fall into the downlink reception band of the LTE component carrier or the NR component carrier in user equipment (UE), thereby causing interference (in-device interference or intra-device interference) within the user equipment. In particular, the NR system is generally susceptible to the effect of IMD because the NR system uses a bandwidth wider than LTE.

In addition to the dual connectivity between the LTE system and the NR system, in the dual connectivity between a plurality of radio communication systems to which different RATs are applied, IMD, harmonics and the like due to two or more uplink transmissions may fall into the reception band, thereby causing intra-device interference.

In view of the above-described problems, an object of the present invention is to provide a technology to perform communication for reducing an adverse effect of intra-device interference in dual connectivity executed in a radio communication system.

Means for Solving the Problem

According to a disclosed technology, a second base station device communicating with a first base station device is provided. The second base station device includes a receiver configured to receive, from the first base station device, information for limiting radio resource allocation;

a controller configured to allocate a radio resource based on the received information for limiting radio resource allocation; and a transmitter configured to transmit information for limiting radio resource allocation to the first base station device, wherein the information for limiting radio resource allocation includes information indicating at least one of a frequency domain and a time domain indicating a location of a radio resource.

Advantageous Effect of the Present Invention

According to the disclosed technology, it is possible to perform communication for reducing an adverse effect of intra-device interference in the dual connectivity executed in the radio communication system.

BRIEF DESCRIPTION OF THE DRAWINGS

FIG. 6 is a diagram illustrating a message example (1) communicating between a master node and a secondary node according to an embodiment of the present invention;

FIG. 8 is a diagram illustrating a message example (2) communicating between a master node and a secondary node according to an embodiment of the present invention;

FIG. 10 is a diagram illustrating a message example (3) communicating between a master node and a secondary node according to an embodiment of the present invention;

FIG. 11 is a diagram illustrating message details (1) communicating between a master node and a secondary node according to an embodiment of the present invention;

FIG. 12 is a diagram illustrating message details (2) communicating between a master node and a secondary node according to an embodiment of the present invention;

FIG. 15 is a diagram illustrating a message example (1) communicating between gNB-DU and gNB-CU according to an embodiment of the present invention;

FIG. 17 is a diagram illustrating a message example (2) communicating between gNB-DU and gNB-CU according to an embodiment of the present invention;

FIG. 19 is a diagram illustrating a message example (3) communicating between gNB-DU and gNB-CU according to an embodiment of the present invention;

FIG. 20 is a diagram illustrating message details (1) communicating between gNB-DU and gNB-CU according to an embodiment of the present invention;

FIG. 21 is a diagram illustrating message details (2) communicating between gNB-DU and gNB-CU according to an embodiment of the present invention;

EMBODIMENTS FOR CARRYING OUT THE INVENTION

Embodiments of the present invention will be described below with reference to the accompanying drawings.

Figure 1:
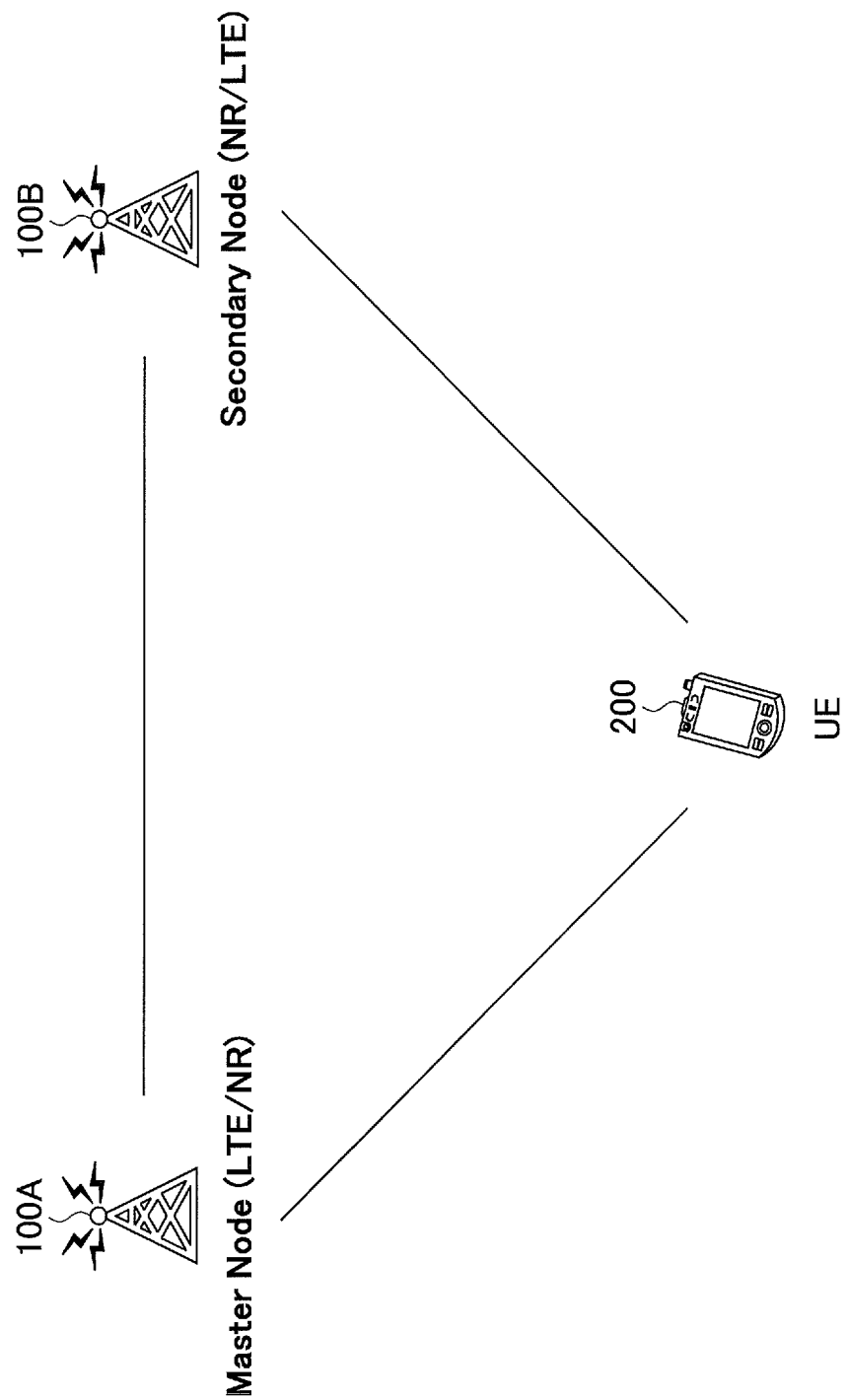
FIG. 1 is a configuration example of a radio communication system according to an embodiment of the present invention.

FIG. 1 is a configuration example of a radio communication system according to an embodiment of the present invention. FIG. 1 is a schematic diagram illustrating a radio communication system according to an embodiment of the present invention.

As depicted in FIG. 1, a user device 200 communicates with a base station device 100A and a base station device 100B (hereinafter referred to as a "base station device 100" unless distinguishing between the base station device 100A and the base station device 100B), provided by an LTE system or an NR system. The user device 200 supports LTE-NR dual connectivity where the base station device 100A acts as a master node eNB and the base station device 100B acts as a secondary node gNB. That is, the user device 200 simultaneously uses a plurality of component carriers provided by the base station device 100A acting as the master node eNB and the base station device 100B acting as the secondary node gNB, so as to perform simultaneous transmission or simultaneous reception with the base station device 100A acting as the master node eNB and the base station device 100B acting as the secondary node gNB. The master node and the secondary node depicted in FIG. 1 may perform communication via, for example, an X2 interface, which is an interface between base stations. In the illustrated embodiment, the LTE system and the NR system each have only one base station. In general, a large number of base station devices 100 are disposed to cover respective service areas of the LTE system and the NR system.

Note that the following embodiments are described with respect to LTE-NR dual connectivity; however, the base station device 100 and the user device 200 according to the present disclosure are not limited to these embodiments. The base station device 100 and the user device 200 may be applicable to dual connectivity between a plurality of radio communication systems using different RATs, that is, multi-RAT dual connectivity, which may be readily understood by those skilled in the art. Further, the base station device 100 and the user device 200 according to the present disclosure may also be applied to NR-NR dual connectivity, or LTE-LTE dual connectivity, for example.

First Embodiment

The following illustrates a first embodiment.

Figure 2:
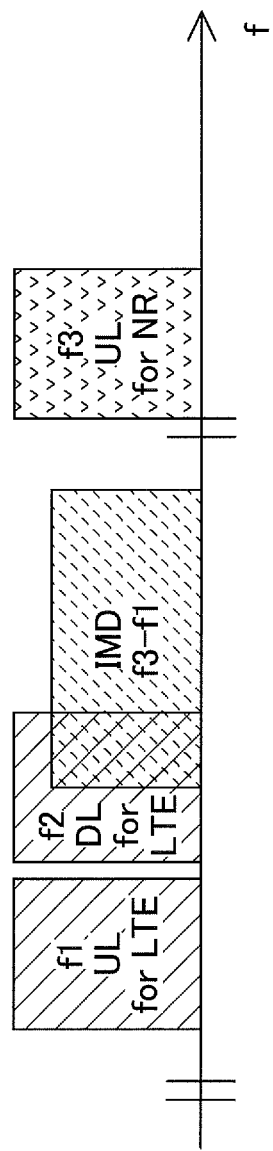
FIG. 2 is a diagram illustrating inter-modulation distortion (IMD) in LTE-NR dual connectivity.

FIG. 2 is a diagram illustrating inter-modulation distortion (IMD) in LTE-NR dual connectivity. The following embodiment discloses a base station device 100 and a user device 200 that support dual connectivity between a plurality of radio communication systems using different RATs, that is, multi RAT dual connectivity. Further, a later-described embodiment illustrates intra-device interference caused by inter-modulation distortion (IMD), harmonics, and the like in dual connectivity (LTE-NR dual connectivity) between the LTE system and the NR system. In the LTE-NR dual connectivity, a typical case such as that depicted in FIG. 2 where intra-device interference occurs may be considered.

In FIG. 1, an LTE duplex scheme is assumed to be FDD and an NR duplex scheme is assumed to be TDD. When the user device 200 communicating in the LTE-NR dual connectivity transmits UL simultaneously in two bands, the IMD may occur. When the user device 200 performs simultaneous transmission at a band that is a UL frequency f1 of LTE and at a band that is a UL frequency f3 of NR, IMD occurs at a band for the frequency f3 to the frequency f1. The band for the frequencies f3 to f1 where IMD occurs overlaps with a band that is a DL frequency f2 of LTE, which thus causes intra-device interference in the DL of the LTE.

In order to maximize the utilization ratio of radio resources, operation of single TX where simultaneous UL transmission is not performed in dual connectivity needs to be avoided. In the LTE-NR dual connectivity, the eNB that is a master node and the gNB that is a secondary node may be operated in a coordinated manner to avoid operation of single TX.

Figure 3:
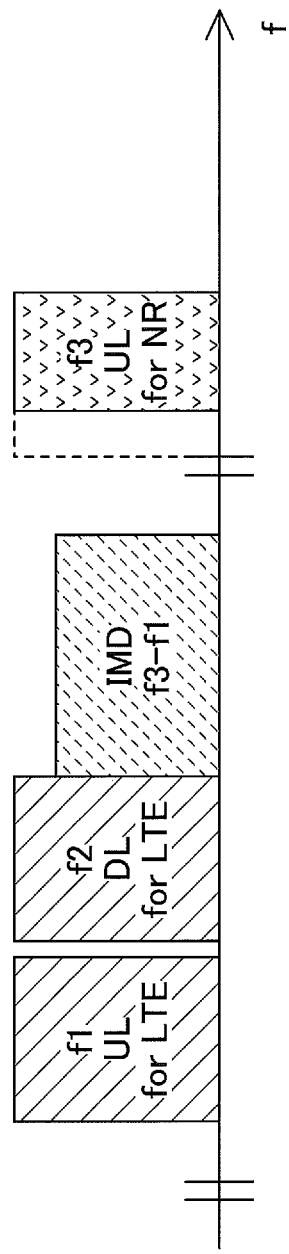
FIG. 3 is a diagram illustrating a radio resource allocation example (1) in LTE-NR dual connectivity according to an embodiment of the present invention.

FIG. 3 is a diagram illustrating a radio resource allocation example (1) in LTE-NR dual connectivity according to an embodiment of the present invention. In FIG. 3, a method of preventing IMD by limiting the allocation of radio resources in the frequency domain will be described.

As illustrated in FIG. 3, in a band that is the UL frequency f3 of NR, when the band allocated by the frequency domain is decreased, the band for the frequencies f3 to f1 where IMD occurs decreases in the frequency domain and will no longer overlap the band that is the DL frequency f2 of LTE. That is, IMD may be prevented by restricting the allocation of radio resources in the frequency domain.

In order to limit the allocation of the radio resources in the frequency domain as described above, the following information needs to be shared between the eNB that is the master node and the gNB that is the secondary node.

1) PRB (Physical Resource Block) that may possibly be used for DL/UL

2) ARFCN (Absolute radio-frequency channel number)

3) Carrier bandwidth

Note that the above information is indicated for each of PCell, PSCell, and SCell.

That is, in order to avoid single TX operation by limiting the allocation of the radio resources in the frequency domain, information on the allocation of radio resources in the frequency domain may need to be indicated via, for example, an X2 interface.

Figure 4:
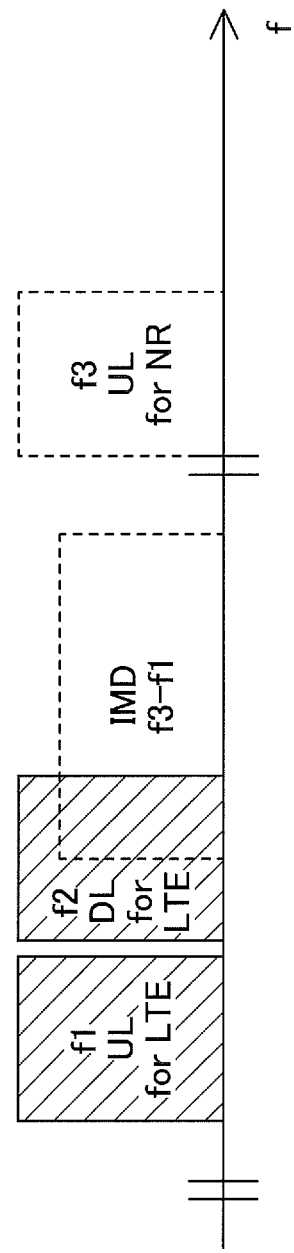
FIG. 4 is a diagram illustrating a radio resource allocation example (2) in LTE-NR dual connectivity according to an embodiment of the present invention.

FIG. 4 is a diagram illustrating a radio resource allocation example (2) in LTE-NR dual connectivity according to an embodiment of the present invention. With respect to FIG.

4, a method of preventing IMD by limiting the allocation of radio resources in the time domain will be described.

As illustrated in FIG. 4, the transmission timing at the band that is the UL frequency f3 of NR is configured so as not to match the transmission timing at the band that is the UL frequency f1 of LTE. IMD will not occur where only one of LTE UL or NR UL is being transmitted. That is, IMD may be prevented by restricting the allocation of radio resources in the time domain.

In order to limit the allocation of radio resources in the time domain as described above, two cases may need to be considered. The two cases require different information.

The first case is a case where the master node eNB and the secondary node gNB are synchronized, or where the timing difference measured by the user device 200, that is, SSTD (SFN and subframe timing difference) is acquired. In the first case, configurations of the subframe or slot that may possibly be used for DL/UL, or a special subframe configuration may need to be shared between the master node eNB and the secondary node gNB.

The second case is a case where the master node eNB and the secondary node gNB are asynchronous, and the timing difference SSTD has not been acquired. In the second case, the start or stop of the interference control needs to be reported between the master node eNB and the secondary node gNB.

That is, in order to avoid single TX operation by limiting the allocation of radio resources in the time domain, information on the allocation of radio resources in the time domain, or the start or stop of the interference control may need to be indicated via, for example, the X2 interface.

The following describes, with reference to FIGS. 5 to 12, examples of sequences between the base station device 100A that is the master node eNB and the base station device 100B that is the secondary node gNB, and examples of messages to be indicated. Note that each sequence described below may be performed at the time of adding SgNB, preparing to change SgNB, starting connection of SgNB, or the like. Note that information for limiting the allocation of radio resources described below may be information applied from the present time, or information applied from the time at which a predetermined time has elapsed, that is, information applied from a certain future time.

Figure 5:
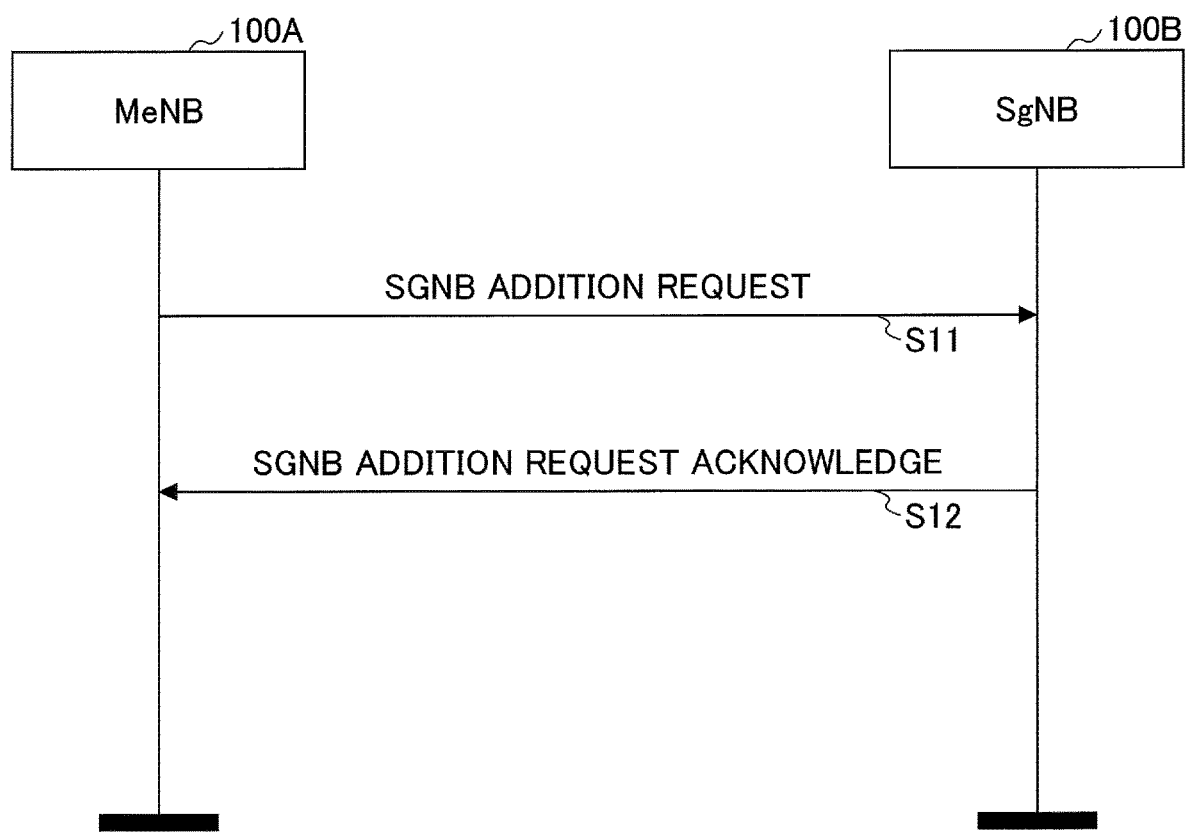
FIG. 5 is a diagram illustrating a sequence example (1) in a master node and a secondary node according to an embodiment of the present invention.

FIG. 5 is a diagram illustrating a sequence example (1) in a master node and a secondary node according to an embodiment of the present invention. As illustrated in FIG. 5, eNB acting as the master node is described as MeNB, and gNB acting as the secondary node is described as SgNB.

In step S11, the base station device 100A that is MeNB transmits "SGNB ADDITION REQUEST" to the base station device 100B that is SgNB. In a subsequent step S12, the base station device 100B that is SgNB transmits "SGNB ADDITION REQUEST ACKNOWLEDGE" to the base station device 100A that is MeNB.

The "SGNB ADDITION REQUEST" message includes information on the radio resource allocation of the MeNB, such that the SgNB may use the information to optimize the radio resource allocation. The "SGNB ADDITION REQUEST ACKNOWLEDGE" message includes information on the radio resource allocation of the SgNB, such that the MeNB may use the information to optimize the radio resource allocation. Note that the Reconfiguration procedure of SgNB may be completed in the sequence of FIG. 5.

FIG. 6 is a diagram illustrating a message example (1) communicating between a master node and a secondary node according to an embodiment of the present invention. As illustrated in FIG. 6, the "SGNB ADDITION REQUEST" message includes an information element "eNB Resource Allocation". The direction in which the message is indicated is MeNB to SgNB. Details "9.2.bb" of the information element "eNB Resource Allocation" will be described later with reference to FIG. 11.

As illustrated in FIG. 6, the "SGNB ADDITION REQUEST ACKNOWLEDGE" message includes an information element "gNB Resource Allocation". The direction in which the message is indicated is SgNB to MeNB. Details "9.2.cc" of the information element "gNB Resource Allocation" will be described later with reference to FIG. 12.

Figure 7:
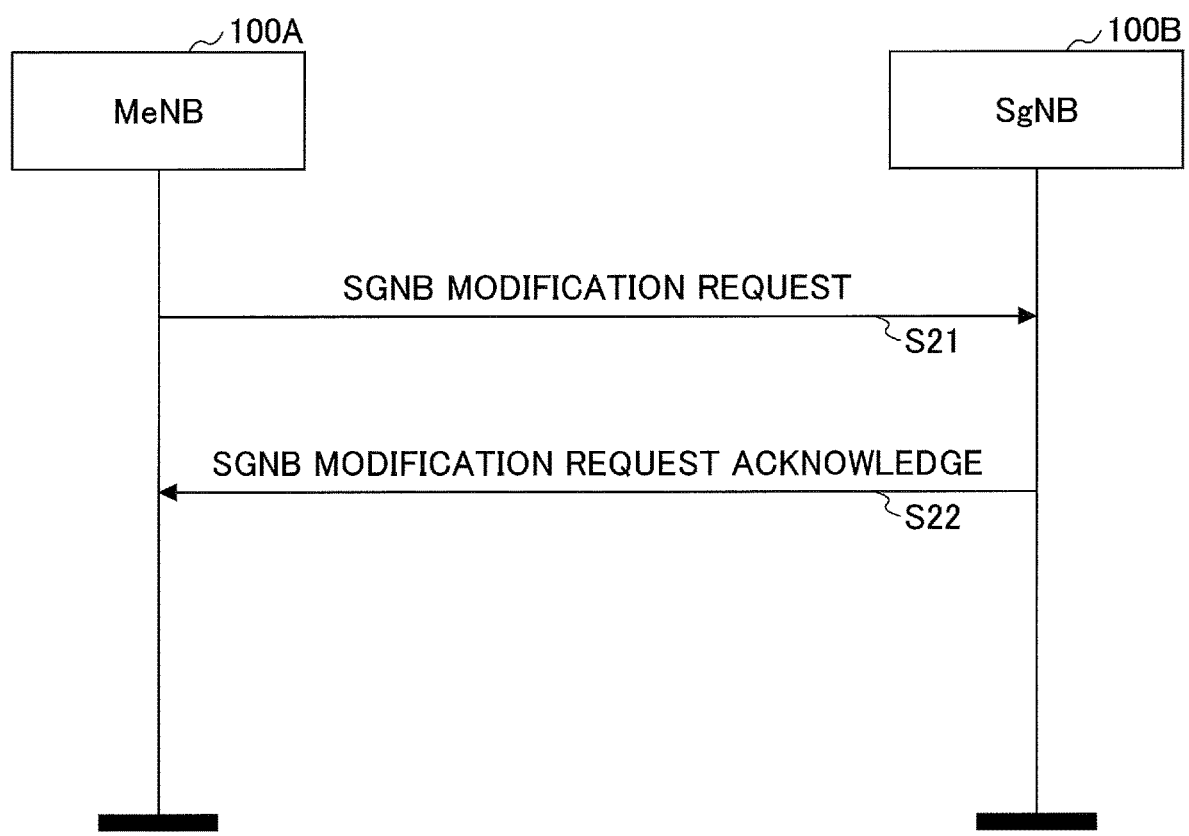
FIG. 7 is a diagram illustrating a sequence example (2) in a master node and a secondary node according to an embodiment of the present invention.

FIG. 7 is a diagram illustrating a sequence example (2) in a master node and a secondary node according to an embodiment of the present invention. As illustrated in FIG. 7, eNB acting as the master node is described as MeNB, and gNB acting as the secondary node is described as SgNB.

In step S21, the base station device 100A acting as MeNB transmits "SGNB MODIFICATION REQUEST" to the base station device 100B acting as SgNB. In a subsequent step S22, the base station device 100B acting as SgNB transmits "SGNB MODIFICATION REQUEST ACKNOWLEDGE" to the base station device 100A acting as MeNB.

The "SGNB MODIFICATION REQUEST" message includes information on the radio resource allocation of the MeNB, such that the SgNB may use the information to optimize the radio resource allocation. The "SGNB MODIFICATION REQUEST ACKNOWLEDGE" message includes information on the radio resource allocation of the SGNB, such that the MeNB may use the information to optimize the radio resource allocation. Note that the Reconfiguration procedure of SgNB may be completed in the sequence of FIG. 7.

FIG. 8 is a diagram illustrating a message example (2) communicating between a master node and a secondary node according to an embodiment of the present invention. As illustrated in FIG. 8, the "SGNB MODIFICATION REQUEST" message includes an information element "eNB Resource Allocation". The direction in which the message is indicated is MeNB to SgNB. Details "9.2.bb" of the information element "eNB Resource Allocation" will be described later with reference to FIG. 11.

As illustrated in FIG. 6, the "SGNB MODIFICATION REQUEST ACKNOWLEDGE" message includes an information element "gNB Resource Allocation". The direction in which the message is indicated is SgNB to MeNB. Details "9.2.cc" of the information element "gNB Resource Allocation" will be described later with reference to FIG. 12.

Figure 9:
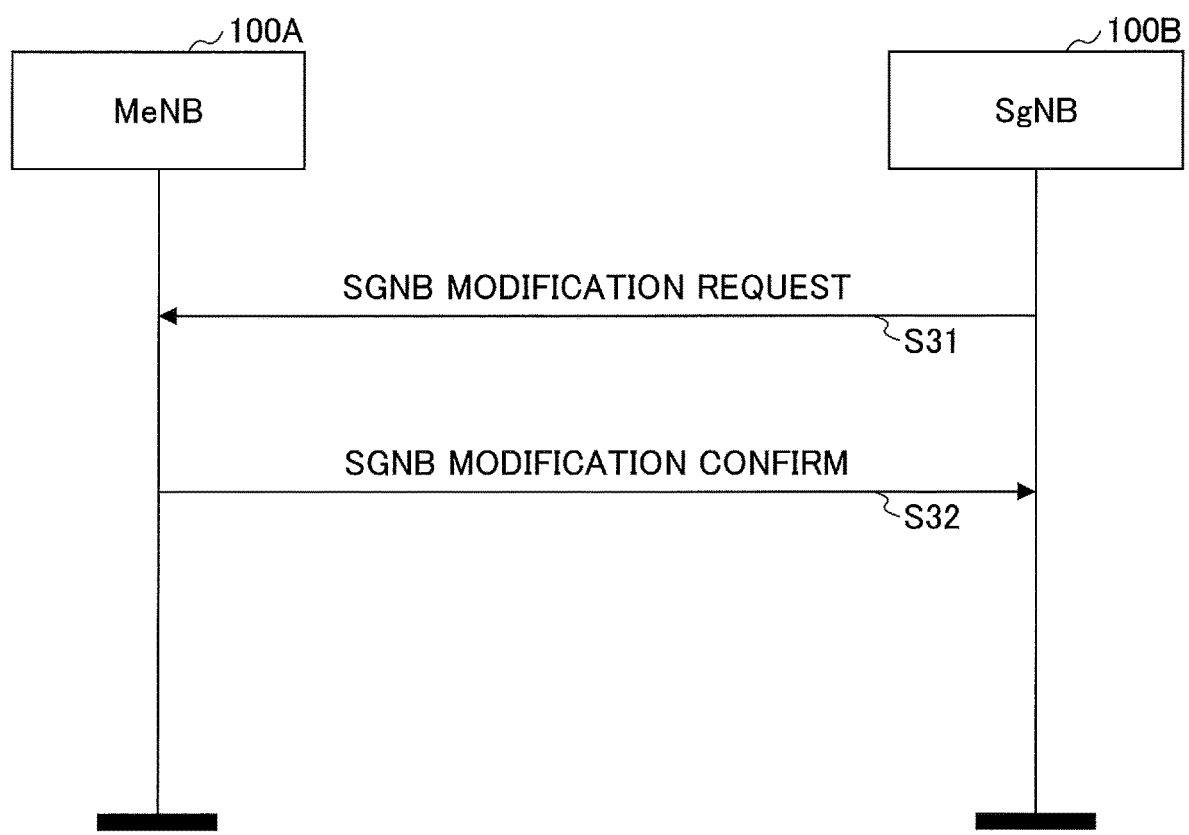
FIG. 9 is a diagram illustrating a sequence example (3) in a master node and a secondary node according to an embodiment of the present invention.

FIG. 9 is a diagram illustrating a sequence example (3) in a master node and a secondary node according to an embodiment of the present invention. As illustrated in FIG. 9, eNB acting as the master node is described as MeNB, and gNB acting as the secondary node is described as SgNB.

In step S31, the base station device 100B acting as SgNB transmits "SGNB MODIFICATION REQUIRED" to the base station device 100A acting as MeNB. In a subsequent step S21, the base station device 100A acting as MeNB transmits "SGNB MODIFICATION CONFIRM" to the base station device 100B acting as SgNB.

The "SGNB MODIFICATION REQUIRED" message includes information on the radio resource allocation of the SgNB, such that the MeNB may use the information to optimize the radio resource allocation. The "SGNB MODIFICATION CONFIRM" message includes information on the radio resource allocation of the MeNB, such that the SgNB may use the information to optimize the radio resource allocation. Note that a Modification Preparation procedure of SgNB may be completed in the sequence of FIG. 9.

FIG. 10 is a diagram illustrating a message example (3) communicating between a master node and a secondary node according to an embodiment of the present invention. As illustrated in FIG. 10, the "SGNB MODIFICATION REQUIRED" message includes an information element "gNB Resource Allocation". The direction in which the message is indicated is SgNB to MeNB. Details "9.2.cc" of the information element "gNB Resource Allocation" will be described later with reference to FIG. 12.

As illustrated in FIG. 6, the "SGNB MODIFICATION CONFIRM" message includes an information element "eNB Resource Allocation". The direction in which the message is indicated is MeNB to SgNB. Details "9.2.bb" of the information element "eNB Resource Allocation" will be described later with reference to FIG. 11.

FIG. 11 is a diagram illustrating message details (1) communicating between a master node and a secondary node according to an embodiment of the present invention. As illustrated in FIG. 11, the "eNB Resource Allocation" includes "Resource Allocation Optimization Request". "Resource Allocation Optimization Request" is information indicating the start or stop of the interference control and is used for optimizing the radio resource allocation.

Further, as illustrated in FIG. 11, "eNB Resource Allocation" includes "DL Potential allocated resource" and "UL Potential allocated resource". The "DL Potential allocated resource" and "UL Potential allocated resource" are information indicating a PRB that may possibly be used for DL/UL.

As illustrated in FIG. 11, the "eNB Resource Allocation" includes "FDD Info". The "FDD Info" is information indicating ARFCN and a carrier bandwidth.

As illustrated in FIG. 11, the "eNB Resource Allocation" includes "TDD Info". The "TDD Info" is information indicating a subframe or slot that may possibly be used for DL/UL.

As illustrated in FIG. 11, the "eNB Resource Allocation" includes "Special Subframe Info". The "Special Subframe Info" is special subframe configuration information.

Although not illustrated in FIG. 11, information on the frequency domain or the time domain of unused radio resources may be included in the "eNB Resource Allocation". That is, the base station device 100 may transmit information on the frequency domain or the time domain of the radio resources that are used by the base station device 100 itself or information on the frequency domain or the time domain of the radio resources that are not used by the base station device 100 itself, to another base station device 100. Note that the base station device 100 may transmit information on the frequency domain or the time domain of the radio resources that are allowed to be used by the other base station device 100 or information on the frequency domain or the time domain of the radio resources that are not allowed to be used by the other base station device 100, to the other base station device 100. The base station device 100 may use the information received from the other base station device 100 for the allocation of radio resources.

FIG. 12 is a diagram illustrating details (2) of messages communicating between a master node and a secondary node according to an embodiment of the present invention. As illustrated in FIG. 12, the "gNB Resource Allocation" includes "Resource Allocation Optimization Request". "Resource Allocation Optimization Request" is information indicating the start or stop of the interference control and is used for optimizing the radio resource allocation.

Further, as illustrated in FIG. 12, "gNB Resource Allocation" includes "DL Potential allocated resource" and "UL Potential allocated resource". The "DL Potential allocated resource" and "UL Potential allocated resource" are information indicating a PRB that may possibly be used for DL/UL.

As illustrated in FIG. 12, the "gNB Resource Allocation" includes "FDD Info". The "FDD Info" is information indicating ARFCN and a carrier bandwidth.

As illustrated in FIG. 12, the "gNB Resource Allocation" includes "TDD Info". The "TDD Info" is information indicating a subframe or slot that may possibly be used for DL/UL.

As illustrated in FIG. 12, the "gNB Resource Allocation" includes "Special Subframe Info". The "Special Subframe Info" is special subframe configuration information.

Although not illustrated in FIG. 12, information on the frequency domain or the time domain of unused radio resources may be included in the "gNB Resource Allocation". The base station device 100 may use the information for the allocation of radio resources. That is, the base station device 100 may transmit information on the frequency domain or the time domain of the radio resources to be used by the base station device 100 itself or information on the frequency domain or the time domain of the radio resources not to be used by the base station device 100 itself, to the other base station device 100. Note that the base station device 100 may transmit information on the frequency domain or the time domain of the radio resources that are allowed to be used by the other base station device 100 or information on the frequency domain or the time domain of the radio resources that are not allowed to be used by the other base station device 100, to the other base station device 100. The base station device 100 may use the information received from the other base station device 100 for the allocation of radio resources.

According to the above-described embodiment, the base station device 100A and the base station device 100B mutually communicate information indicating a location in the frequency domain or in the time domain with respect to the radio resource allocation, information indicating the start or stop of the interference control, and the like, which enables IMD-prevented radio resource allocation.

That is, the above-described configuration enables communication to reduce an adverse effect of intra-device interference in the dual connectivity executed in the radio communication system.

Second Embodiment

The following illustrates a second embodiment.

Figure 13:
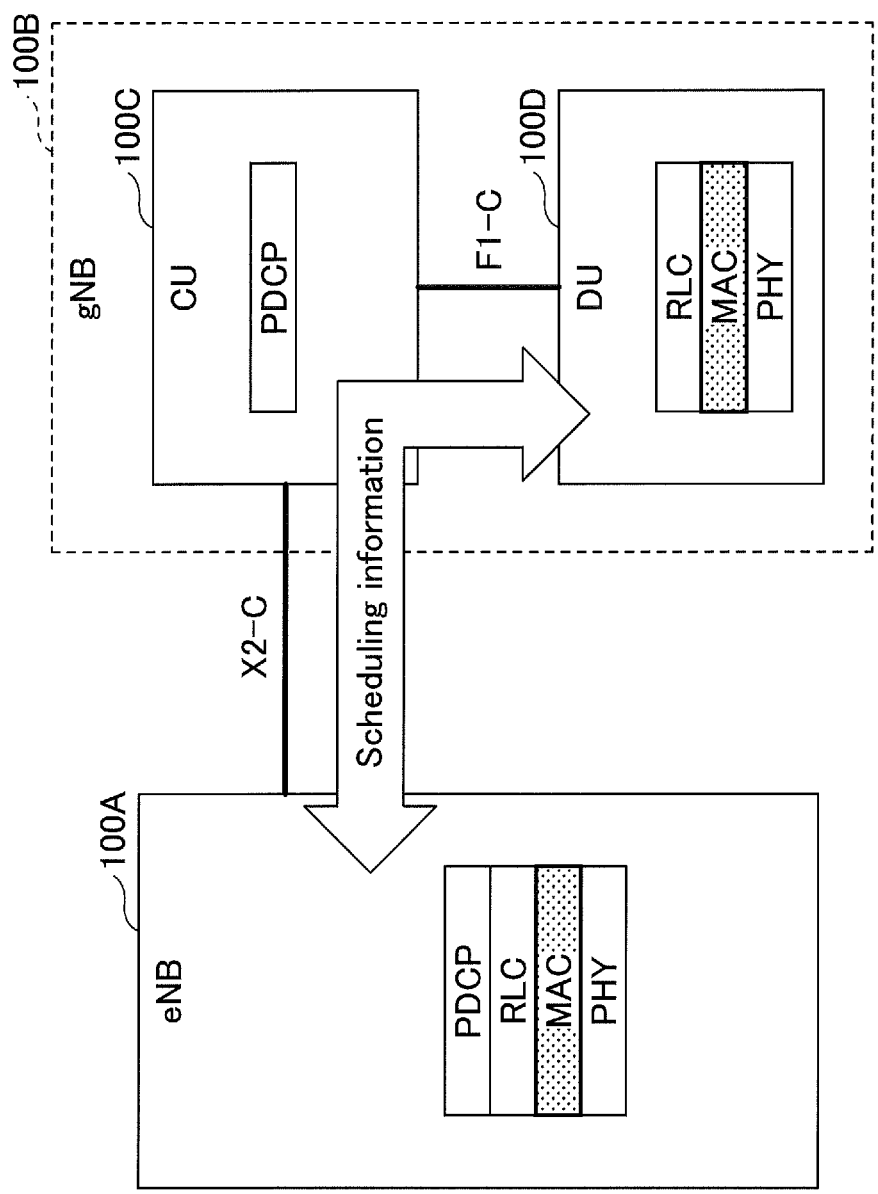
FIG. 13 is a configuration example of a base station device 100 according to an embodiment of the present invention.

FIG. 13 is a configuration example of a base station device 100 according to the second embodiment of the present invention.

As illustrated in FIG. 13, a base station device 100B acting as gNB may include gNB-CU 100C and gNB-DU 100D. The gNB-CU 100C and the gNB-DU 100D are connected via an F1-C interface. In addition, the gNB-CU 100C and the eNB 100A are connected by an X2-C interface. The eNB 100A and the NB3-DU 100D communicate scheduling information each other. The scheduling information includes information on a location in the frequency domain or a location in the time domain with respect to the radio resource allocation, information indicating the start or stop of the interference control, and the like described in the first embodiment. Thus, the configuration of the second embodiment enables the IMD-reduced radio resource allocation in a manner similar to the first embodiment.

The following illustrates examples of a sequence and a message to be indicated in the gNB-CU 1000 and the gNB-DU 100D with reference to FIGS. 14 to 21, along with communication between the eNB 100A and the NB3-DU 100D described above. Note that the sequence described below may be performed at the time of adding SgNB, preparing to change SgNB, starting connection of SgNB, or the like. Note that information for limiting the allocation of radio resources described below may be information applied from the present time, or information applied from the time at which a predetermined time has elapsed, that is, information applied from a certain future time.

Figure 14:
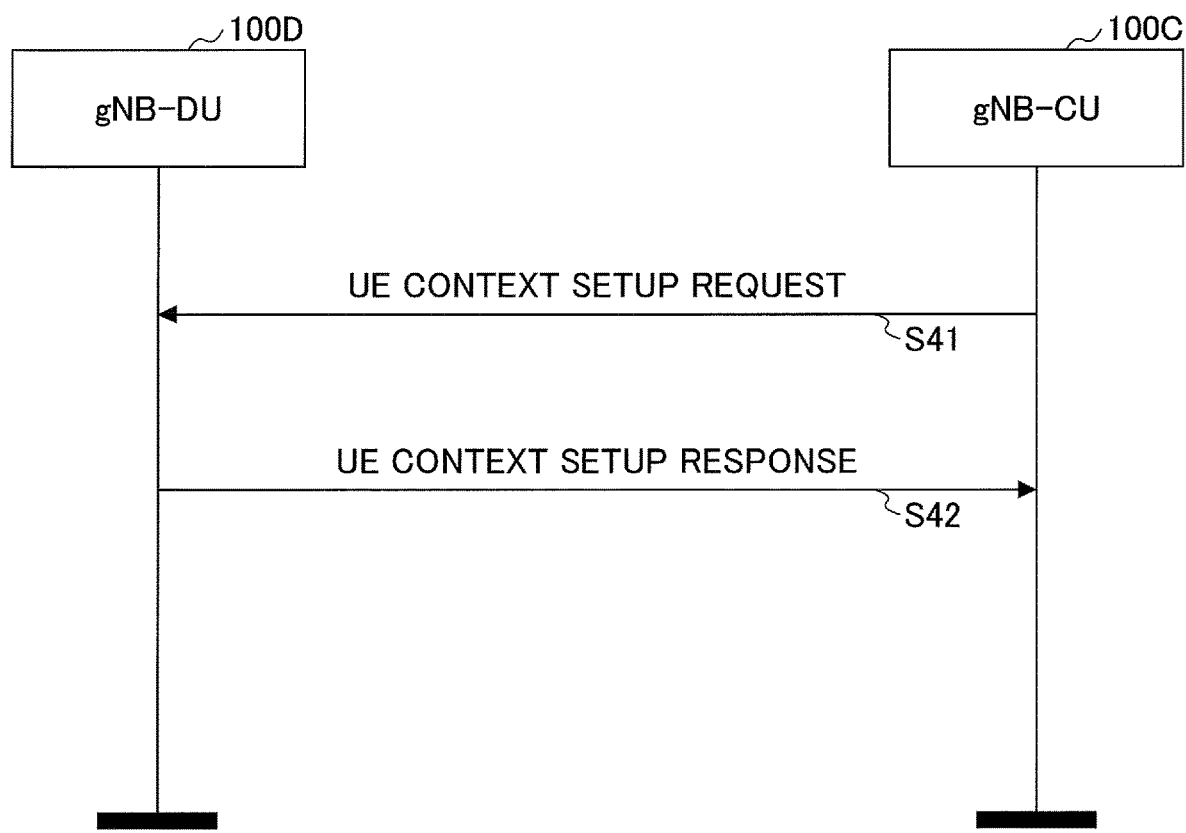
FIG. 14 is a diagram illustrating a sequence example (1) in gNB-DU and gNB-CU according to an embodiment of the present invention.

FIG. 14 is a diagram illustrating a sequence example (1) in gNB-DU and gNB-CU according to an embodiment of the present invention.

In step S41, the gNB-CU 100C transmits "UE CONTEXT SETUP REQUEST" to the gNB-DU 100D. In a subsequent step S42, the gNB-DU 100D transmits "UE CONTEXT SETUP RESPONSE" to the gNB-CU 100C.

The "UE CONTEXT SETUP REQUEST" message includes information on the radio resource allocation of the MeNB, such that the SgNB may use the information to optimize the radio resource allocation. The "UE CONTEXT SETUP RESPONSE" message includes information on the radio resource allocation of the SgNB, such that the MeNB may use the information to optimize the radio resource allocation.

FIG. 15 is a diagram illustrating a message example (1) communicating between gNB-DU and gNB-CU according to an embodiment of the present invention. As illustrated in FIG. 15, the "UE CONTEXT SETUP REQUEST" message includes an information element "eNB Resource Allocation". The direction in which the message is indicated is gNB-CU to gNB-DU. Details "9.3.2.XX" of the information element "eNB Resource Allocation" will be described later with reference to FIG. 20.

As illustrated in FIG. 15, the "UE CONTEXT SETUP RESPONSE" message includes an information element "gNB Resource Allocation". The direction in which the message is indicated is gNB-DU to gNB-CU. Details "9.3.2.YY" of the information element "gNB Resource Allocation" will be described later with reference to FIG. 21.

Figure 16:
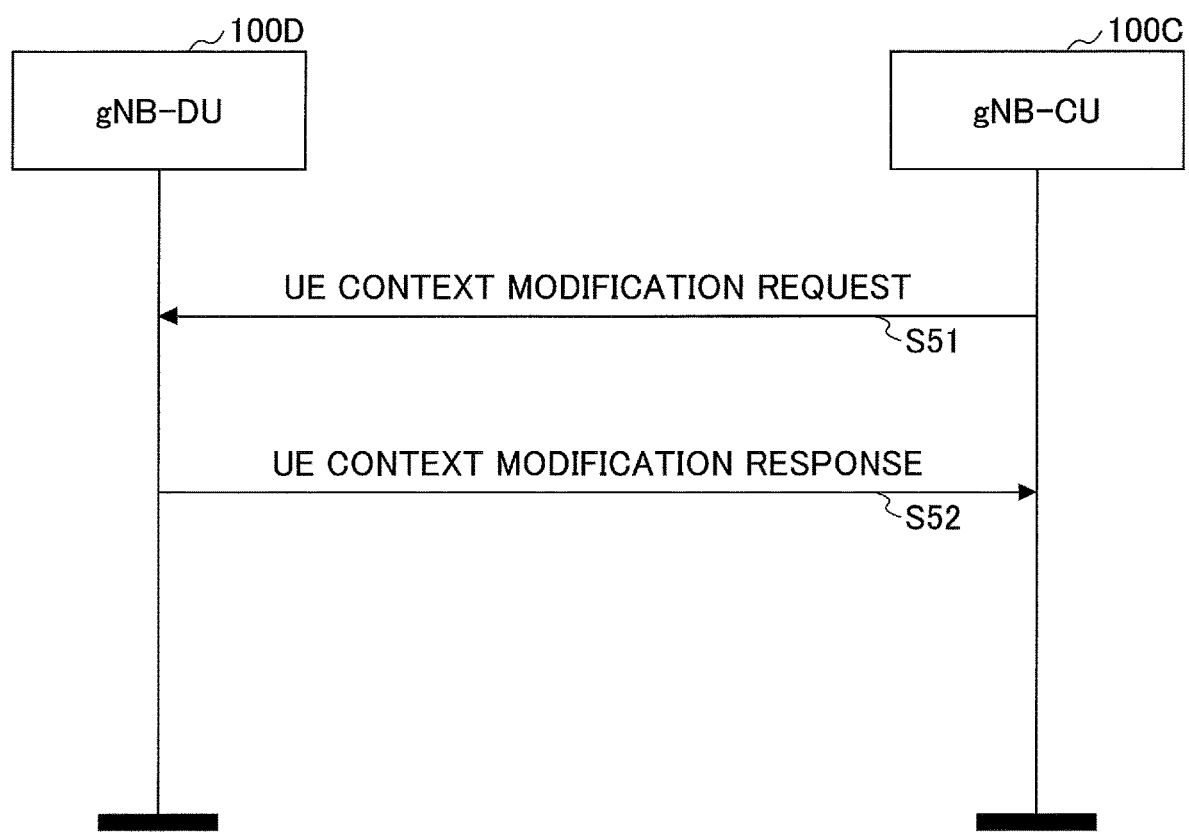
FIG. 16 is a diagram illustrating a sequence example (2) in gNB-DU and gNB-CU according to an embodiment of the present invention.

FIG. 16 is a diagram illustrating a sequence example (2) in gNB-DU and gNB-CU according to an embodiment of the present invention.

In step S51, the gNB-CU 100C transmits "UE CONTEXT MODIFICATION REQUEST" to the gNB-DU 100D. In a subsequent step S52, the gNB-DU 100D transmits "UE CONTEXT MODIFICATION RESPONSE" to the gNB-CU 100C.

The "UE CONTEXT MODIFICATION REQUEST" message includes information on the radio resource allocation of the MeNB, such that the SgNB may use the information to optimize the radio resource allocation. The "UE CONTEXT MODIFICATION RESPONSE" message includes information on the radio resource allocation of the SgNB, such that the MeNB may use the information to optimize the radio resource allocation.

FIG. 17 is a diagram illustrating a message example (2) communicating between gNB-DU and gNB-CU according to an embodiment of the present invention. As illustrated in FIG. 17, the "UE CONTEXT MODIFICATION REQUEST" message includes an information element "eNB Resource Allocation". The direction in which the message is indicated is gNB-CU to gNB-DU. Details "9.3.2.XX" of the information element "eNB Resource Allocation" will be described later with reference to FIG. 20.

As illustrated in FIG. 17, the "UE CONTEXT MODIFICATION RESPONSE" message includes an information element "gNB Resource Allocation". The direction in which the message is indicated is gNB-DU to gNB-CU. Details "9.3.2.YY" of the information element "gNB Resource Allocation" will be described later with reference to FIG. 21. The "UE CONTEXT MODIFICATION RESPONSE" message may include an information element "Message Type", an information element "gNB-CU UE F1AP ID", and an information element "gNB-DU UE F1AP ID".

Figure 18:
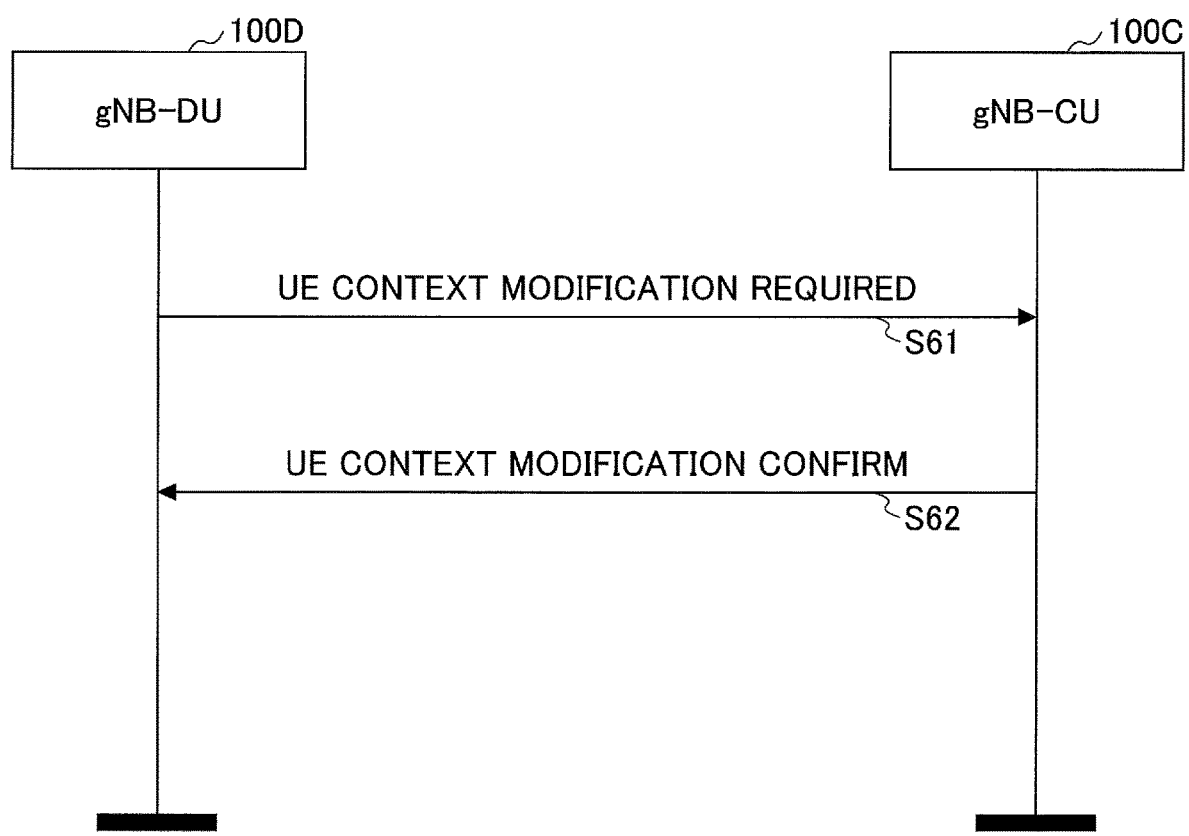
FIG. 18 is a diagram illustrating a sequence example (3) in gNB-DU and gNB-CU according to an embodiment of the present invention.

FIG. 18 is a diagram illustrating a sequence example (3) in gNB-DU and gNB-CU according to an embodiment of the present invention.

In step S61, the gNB-DU 100D transmits "UE CONTEXT MODIFICATION REQUIRED" to the gNB-CU 100C. In a subsequent step S62, the gNB-CU 100C transmits "UE CONTEXT MODIFICATION CONFIRM" to the gNB-DU 100D.

The "UE CONTEXT MODIFICATION REQUIRED" message includes information on the radio resource allocation of the SgNB, such that the MeNB may use the information to optimize the radio resource allocation. The "UE CONTEXT MODIFICATION CONFIRM" message includes information on the radio resource allocation of the MeNB, such that the SgNB may use the information to optimize the radio resource allocation.

FIG. 19 is a diagram illustrating a message example (3) communicating between gNB-DU and gNB-CU according to an embodiment of the present invention. As illustrated in FIG. 19, the "UE CONTEXT MODIFICATION REQUIRED" message includes an information element "gNB Resource Allocation". The direction in which the message is indicated is gNB-DU to gNB-CU. Details "9.3.2.YY" of the information element "gNB Resource Allocation" will be described later with reference to FIG. 21. The "UE CONTEXT MODIFICATION REQUIRED" message may include an information element "Message Type", an information element "gNB-CU UE F1AP ID", and an information element "gNB-DU UE F1AP ID".

As illustrated in FIG. 19, the "UE CONTEXT MODIFICATION CONFIRM" message includes an information element "eNB Resource Allocation". The direction in which the message is indicated is gNB-CU to gNB-DU. Details "9.3.2.XX" of the information element "eNB Resource Allocation" will be described later with reference to FIG. 20. The "UE CONTEXT MODIFICATION CONFIRM" message may include an information element "Message Type", an information element "gNB-CU UE F1AP ID", and an information element "gNB-DU UE F1AP ID".

FIG. 20 is a diagram illustrating message details (1) communicating between gNB-DU and gNB-CU according to an embodiment of the present invention.

FIG. 20 is a diagram illustrating message details (1) communicating between a master node and a secondary node according to an embodiment of the present invention. As illustrated in FIG. 20, the "eNB Resource Allocation" includes "Resource Allocation Optimization Request". "Resource Allocation Optimization Request" is information indicating the start or stop of the interference control and is used for optimizing the radio resource allocation.

Further, as illustrated in FIG. 20, "eNB Resource Allocation" includes "DL Potential allocated resource" and "UL Potential allocated resource". The "DL Potential allocated resource" and "UL Potential allocated resource" are information indicating a PRB that may possibly be used for DL/UL.

As illustrated in FIG. 20, the "eNB Resource Allocation" includes "FDD Info". The "FDD Info" is information indicating ARFCN and a carrier bandwidth.

As illustrated in FIG. 20, the "eNB Resource Allocation" includes "TDD Info". The "TDD Info" is information indicating a subframe or slot that may possibly be used for DL/UL.

As illustrated in FIG. 20, the "eNB Resource Allocation" includes "Special Subframe Info". The "Special Subframe Info" is special subframe configuration information.

Although not illustrated in FIG. 20, information on the frequency domain or the time domain of unused radio resources may be included in the "eNB Resource Allocation". The base station device 100 may use the information for the allocation of radio resources. That is, the base station device 100 may transmit information on the frequency domain or the time domain of the radio resources to be used by the base station device 100 itself or information on the frequency domain or the time domain of the radio resources not to be used by the base station device 100 itself, to the other base station device 100. Note that the base station device 100 may transmit information on the frequency domain or the time domain of the radio resources that are allowed to be used by the other base station device 100 or information on the frequency domain or the time domain of the radio resources that are not allowed to be used by the other base station device 100, to the other base station device 100. The base station device 100 may use the information received from the other base station device 100 for the allocation of radio resources.

FIG. 21 is a diagram illustrating details (2) of messages communicating between gNB-DU and gNB-CU according to an embodiment of the present invention. As illustrated in FIG. 21, the "gNB Resource Allocation" includes "Resource Allocation Optimization Request". The "Resource Allocation Optimization Request" is information indicating the start or stop of the interference control and is used for optimizing the radio resource allocation.

Further, as illustrated in FIG. 21, "gNB Resource Allocation" includes "DL Potential allocated resource" and "UL Potential allocated resource". The "DL Potential allocated resource" and "UL Potential allocated resource" are information indicating a PRB that may possibly be used for DL/UL.

As illustrated in FIG. 21, the "gNB Resource Allocation" includes "FDD Info". The "FDD Info" is information indicating ARFCN and a carrier bandwidth.

As illustrated in FIG. 21, the "gNB Resource Allocation" includes "TDD Info". The "TDD Info" is information indicating a subframe or slot that may possibly be used for DL/UL.

As illustrated in FIG. 21, the "gNB Resource Allocation" includes "Special Subframe Info". The "Special Subframe Info" is special subframe configuration information.

Although not illustrated in FIG. 21, information on the frequency domain or the time domain of unused radio resources may be included in the "gNB Resource Allocation". The base station device 100 may use the information for the allocation of radio resources. That is, the base station device 100 may transmit information on the frequency domain or the time domain of the radio resources to be used by the base station device 100 itself or information on the frequency domain or the time domain of the radio resources not to be used by the base station device 100 itself, to the other base station device 100. Note that the base station device 100 may transmit information on the frequency domain or the time domain of the radio resources that are allowed to be used by the other base station device 100 or information on the frequency domain or the time domain of the radio resources that are not allowed to be used by the other base station device 100, to the other base station device 100. The base station device 100 may use the information received from the other base station device 100 for the allocation of radio resources.

According to the above-described embodiment, the base station device 100A and the base station device 100B mutually communicate information indicating a location in the frequency domain or in the time domain with respect to the radio resource allocation, information indicating the start or stop of the interference control, and the like through communication via the gNB-CU and the gNB-DU, which enables IMD-prevented radio resource allocation.

That is, the above-described configuration enables communication to reduce an adverse effect of intra-device interference in the dual connectivity executed in the radio communication system.

Device Configuration

Next, a functional configuration example of the base station device 100 that executes the processes and operations described above will be described. The base station device 100 includes at least functions for implementing the embodiments. Note that the base station device 100 may have only a part of functions in the embodiments.

Figure 22:
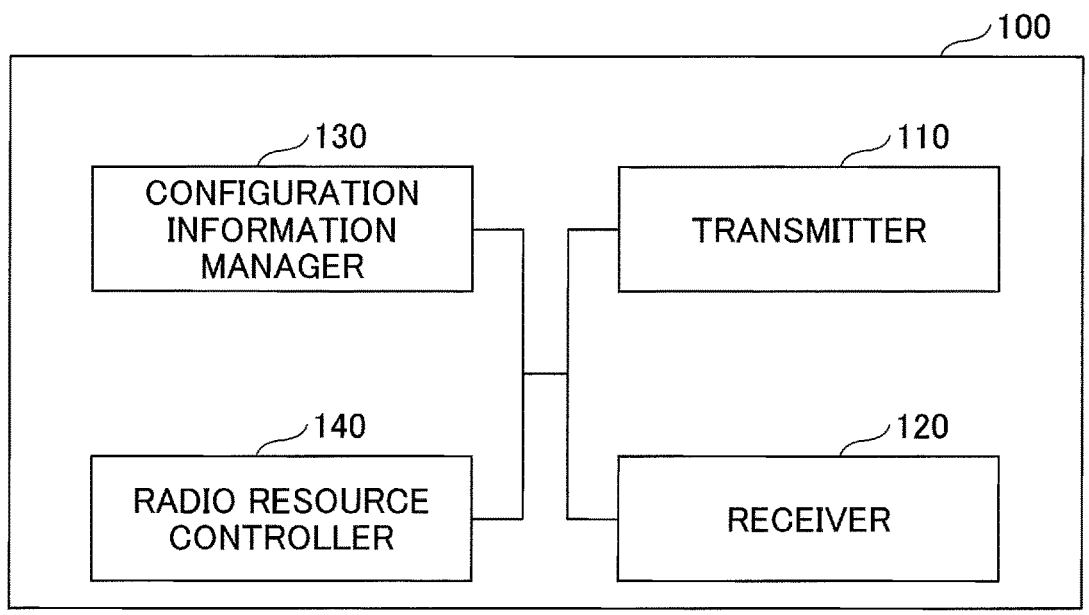
FIG. 22 is a diagram illustrating a functional configuration example of a base station device 100 according to an embodiment of the present invention.

FIG. 22 is a diagram illustrating a functional configuration example of a base station device 100. As illustrated in FIG. 22, the base station device 100 includes a transmitter 110, a receiver 120, a configuration information manager 130, and a radio resource controller 140. The functional configuration of the base station device 100 illustrated in FIG. 22 is merely an example. Any terms for describing functional classification and functional components may be applied insofar as the operations according to the present embodiment may be executed.

The transmitter 110 includes a function of generating a signal to be transmitted to the user device 200 or to another base station device 100, and of transmitting the generated signal wirelessly. The receiver 120 includes a function of receiving various signals transmitted from the user device 200 or another base station device 100, and of acquiring information on a higher layer from the received signal. In addition, the transmitter 110 has a function of transmitting NR-PSS, NR-SSS, NR-PBCH, DL/UL control signals and the like to the user device 200. In addition, the transmitter 110 transmits information relating to transmission power control, information relating to the scheduling, and information relating to the measurement configurations to the user device 200, and the receiver 120 receives a message relating to a report of the measurement results from the user device 200. In addition, the transmitter 110 transmits a message relating to radio resource allocation to another base station device 100, and the receiver 120 receives a message relating to radio resource allocation from the other base station device 100.

The configuration information manager 130 stores preset configuration information and various configuration information to be transmitted to the user device 200. The content of the configuration information is, for example, information used for measurement configurations in the user device 200, information for communicating with another base station device 100, and the like.

The radio resource controller 140 performs control relating to radio resource allocation including message exchanges between the base station devices 100 or between gNB-CU and gNB-DU described in the embodiments.

Note that the base station device 100A acting as the eNB, the base station device 100B acting as the gNB, the base station device 100C acting as the gNB-CU, and the base station device 100D acting as the gNB-DU have a part of or all of the functions similar to those of the base station device 100 described above.

Hardware Configuration

The functional configuration diagram (FIG. 22) used in the above description of the embodiments of the present invention illustrates functional block units. These functional blocks (functional components) are implemented by any combination of hardware components or software components. The components for implementing respective functional blocks are not particularly specified. That is, the functional blocks may be implemented by one device physically and/or logically combining multiple elements or may be implemented by two or more physically and/or logically separated devices that are connected directly and/or indirectly (e.g., wired and/or wireless).

Figure 23:
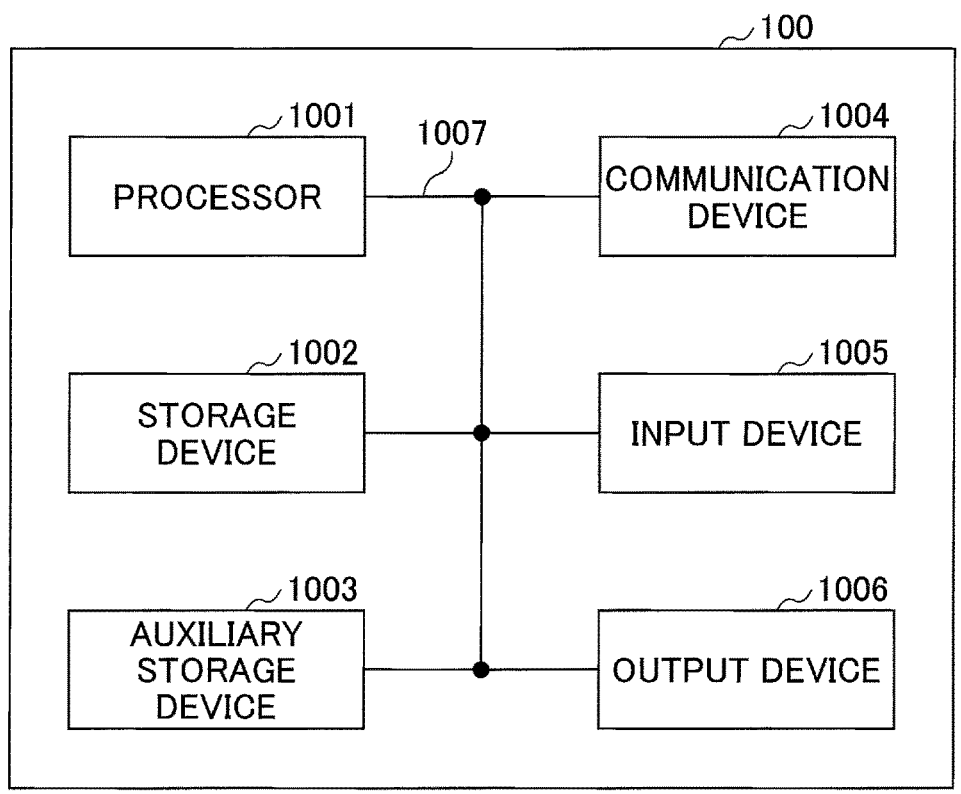
FIG. 23 is a diagram illustrating a hardware configuration example of a base station device 100 according to an embodiment of the present invention.

Further, the base station device 100 in one embodiment of the present invention may function as a computer that performs processing according to the embodiments. FIG. 23 is a diagram illustrating a hardware configuration example of a base station device 100 according to the embodiments of the present invention. The base station device 100 may be physically configured as a computer device that includes a processor 1001, a storage device 1002, an auxiliary storage device 1003, a communication device 1004, an input device 1005, an output device 1006, and a bus 1007.

In the following description, the term "device" may be replaced with a circuit, a device, a unit, or the like. The hardware configuration of the base station device 100 may be configured to include one or more of the respective devices illustrated with reference to 1001 to 1006 in FIG. 22 or may be configured without including some of these devices.

The functions of the base station device 100 are implemented by allowing predetermined software (programs) to be loaded on the hardware such as the processor 1001, the storage device 1002, and the like, so as to cause the processor 1001 to perform calculations to control communications by the communication device 1004, and reading and/or writing of data in the storage device 1002 and the auxiliary storage device 1003.

The processor 1001 may, for example, operate an operating system to control the entire computer. The processor 1001 may be configured to include a central processing unit (CPU) having an interface with peripherals, a control device, an operation device, and registers.

In addition, the processor 1001 loads programs (program codes), software modules or data from the auxiliary storage device 1003 and/or the communication device 1004 into the storage device 1002, and executes various processes according to the loaded programs, software modules or data. The programs are configured to cause a computer to execute at least a part of the operations described in the above embodiments. For example, the transmitter 110, the receiver 120, the configuration information manager 130, and the radio resource controller 140 of the base station device 100 illustrated in FIG. 22 may be implemented by a control program that is stored in the storage device 1002 and that operates on the processor 1001. The above-described various processes are described as being executed by one processor 1001; however, these processes may be executed simultaneously or sequentially by two or more processors 1001. The processor 1001 may be implemented by one or more chips. Note that the programs may be transmitted from a network via an electric communication line.

The storage device 1002 may be a computer-readable recording medium composed of at least one of a ROM (Read Only Memory), an EPROM (Erasable Programmable ROM), an EEPROM (Electrically Erasable Programmable ROM), a RAM (Random Access Memory) and the like. The storage device 1002 may be referred to as a register, a cache, a main memory (a main storage device), or the like. The storage device 1002 may store executable programs (program codes), software modules, and the like for implementing a process according to the embodiments of the present invention.

The auxiliary storage device 1003 is a computer-readable recording medium composed, for example, of at least one of an optical disk such as a CD-ROM (Compact Disc ROM), a hard disk drive, a flexible disk, a magneto-optical disk (e.g., a compact disk, a digital versatile disk, and a Blu-ray (registered trademark) disk), a smart card, a flash memory (e.g., a card, a stick, and a key drive), a floppy (registered trademark) disk, and a magnetic strip. The auxiliary storage device 1003 may be referred to as an auxiliary storage device. The above-described storage medium may be, for example, a database, a server, or another appropriate medium including the storage device 1002 and/or the auxiliary storage device 1003.

The communication device 1004 is hardware (a transmitting-receiving device) for performing communications between computers via a wired and/or wireless network. The communication device 1004 may also be referred to as a network device, a network controller, a network card, a communication module, or the like. For example, the transmitter 110 and the receiver 120 of the base station device 100 may be implemented by the communication device 1004.

The input device 1005 is configured to receive an input from the outside. Examples of the input device include a keyboard, a mouse, a microphone, a switch, a button, and a sensor. The output device 1006 is configured to generate an output to the outside. Examples of the output device include a display, a speaker, and an LED lamp. Note that the input device 1005 and the output device 1006 may have an integrated configuration (e.g., a touch panel).

In addition, the respective devices such as the processor 1001 and the storage device 1002 may be connected via a bus 1007 for mutually communicating information with one another. The bus 1007 may be composed of a single bus or may be composed of different buses between the devices.

Further, the base station device 100 includes hardware such as a microprocessor, a digital signal processor (DSP), an ASIC (Application Specific Integrated Circuit), a PLD (Programmable Logic Device), and an FPGA (Field Programmable Gate Array); a part of or all of the functional blocks of the base station device 100 may be implemented by the hardware. For example, the processor 1001 may be implemented with at least one of these hardware components.

Note that the base station device 100A acting as the eNB, the base station device 100B acting as the gNB, the base station device 100C acting as the gNB-CU, and the base station device 100D acting as the gNB-DU may have a part of or all of the hardware configurations similar to those of the base station device 100 described above.

Summary of Embodiments

According to the embodiments described above, a second base station device communicating with a first base station device is provided. The second base station device includes a receiver configured to receive information for limiting arrangement of radio resources from the first base station device;

a controller configured to allocate a radio resource based on the received information for limiting radio resource allocation; and a transmitter configured to transmit information for limiting radio resource allocation to the first base station device, wherein the information for limiting radio resource allocation includes information indicating at least one of a frequency domain and a time domain indicating a location of a radio resource.

According to the above-described configuration, the base station device 100A and the base station device 100B mutually communicate information indicating a location in the frequency domain or in the time domain with respect to the radio resource allocation, information indicating the start or stop of the interference control, and the like through communication via the gNB-CU and the gNB-DU, which enables IMD-prevented radio resource allocation. That is, the above-described configuration enables communication to reduce an adverse effect of intra-device interference in the dual connectivity executed in the radio communication system.

The information for limiting radio resource allocation may include information indicating a frequency domain indicating a location of a radio resource, and the information indicating the frequency domain may include a part of or all of a physical resource block, an index indicating a frequency, and a carrier band width to be potentially used by the first base station device or the second base station device for downlink or uplink. According to this configuration, the base station device 100 may indicate a location in the frequency domain with respect to the radio resource allocation.

In a case where the first base station device and the second base station device are synchronized, or a timing difference between the first base station device and the second base station device is acquired, the information for limiting radio resource allocation may include information indicating a time domain indicating a location of a radio resource, and the information indicating a time domain indicating a location of a radio resource may include a part of or all of configurations of a subframe or a slot, and a special subframe to be potentially used for downlink or/and uplink. According to this configuration, the base station device 100 may indicate a location in the time domain with respect to the radio resource allocation.

In a case where the first base station device and the second base station device are asynchronous, and a timing difference between the first base station device and the second base station device is not acquired, the information for limiting radio resource allocation may include information indicating a time domain indicating a location of a radio resource, and the information indicating a time domain indicating a location of a radio resource may include information that indicates whether to start interference control. According to this configuration, the base station device 100 may indicate a location in the time domain with respect to the radio resource allocation.

The information for limiting radio resource allocation may include information indicating a frequency domain indicating a location of a radio resource and information indicating a time domain indicating a location of a radio resource. According to this configuration, the base station device 100 may indicate a location in the frequency domain and in the time domain with respect to the radio resource allocation.

The information for limiting radio resource allocation may include information indicating a frequency domain indicating a location of an unused radio resource and information indicating a time domain indicating a location of an unused radio resource. According to this configuration, the base station device 100 may indicate a location in the frequency domain with respect to the unused radio resource allocation.

Supplementary Description of Embodiments

The embodiments have been described as described above; however, the disclosed invention is not limited to these embodiments, and a person skilled in the art would understand various variations, modifications, replacements, or the like. Specific examples of numerical values have been used for encouraging understanding of the present invention; however, these numeric values are merely examples and, unless otherwise noted, any appropriate values may be used. In the above description, partitioning of items is not essential to the present invention. Matters described in two or more items may be combined if necessary. Matters described in one item may be applied to matters described in another item (as long as they do not conflict). In a functional block diagram, boundaries of functional units or processing units do not necessarily correspond to physical boundaries of parts. Operations of multiple functional units may be physically performed in a single part, or operations of a single functional unit may be physically performed by multiple parts. The order of steps in the above described operating procedures according to an embodiment may be changed as long as there is no contradiction. For the sake of description convenience, the base station device 100 and the user device 200 have been described by using functional block diagrams. These devices may be implemented by hardware, by software, or by combination of both. The software which is executed by a processor included in the base station device 100 according to an embodiment and the software which is executed by a processor included in the user device 200 may be stored in a random access memory (RAM), a flash memory, a read-only memory (ROM), an EPROM, an EEPROM, a register, a hard disk drive (HDD), a removable disk, a CD-ROM, a database, a server, or any other appropriate recording medium.

Further, reporting of information is not limited to the aspects/embodiments described in this specification, and may be performed in other ways. For example, reporting of information may be performed by physical layer signaling (e.g., DCI [Downlink Control Information], UCI [Uplink Control Information]), upper layer signaling (e.g., RRC [Radio Resource Control] signaling, MAC [Medium Access Control] signaling, broadcast information (MIB [Master Information Block] and SIB [System Information Block]))), and other signals or a combination thereof. Further, RRC signaling may be referred to as an RRC message, and may be an RRC connection setup (RRC connection setup) message, an RRC connection reconfiguration (RRC connection registration) message, or the like.

Each aspect/embodiment described herein may be applied to LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-Wide Band), Bluetooth (registered trademark), and a system that utilizes other suitable systems and/or a next generation system expanded based on such a system.

The order of processes, sequences, flowcharts, etc. of each aspect/embodiment described in the present specification may be exchanged as long as there is no inconsistency. For example, for the methods described herein, elements of the various steps are presented in an exemplary order and are not limited to the specific order presented.

The specific operation that is performed by the base station device 100 in this specification may be performed by its upper node in some cases. In a network composed of one or more network nodes having a base station device 100, it is clear that the various operations performed for communication with the user device 200 may be performed by other network nodes than the base station device 100 and/or the base station device 100. Examples of such other network nodes include, but are not limited to, MME or S-GW. In the above embodiments, a case where there is one network node other than the base station device 100 is described; however, a plurality of other network nodes other than the base station device 100 may be combined (e.g., MME and S-GW).

Aspects/embodiments described in this specification may be used alone or in combination, or may be switched in accordance with execution.

The user device 200 may also be referred to, by those skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other suitable terms.

The base station device 100 may also be referred to, by those skilled in the art, as NB (Node B), eNB (enhanced Node B), Base Station, gNB, or several other suitable terms.

As used herein, the terms "determining" and "deciding" may encompass a wide variety of actions. The terms "determining" and "deciding" may be deemed to include, for example, judging, calculating, computing, processing, deriving, investigating, looking up (e.g., searching tables, databases or other data structures), and ascertaining. Further, the terms "determining" and "deciding" may be deemed to include, for example, receiving (e.g., receiving information), transmitting (e.g., transmitting information), input, output, and accessing (e.g., accessing data in memory). Moreover, the terms "determining" and "deciding", may be deemed to include, for example, resolving, selecting, choosing, establishing, and comparing (comparing). In other words, the terms "determining" and "deciding" may be deemed to include, "determining" and "deciding" to take some action.

As used herein, the phrase "based on" does not mean "based only on" unless explicitly stated otherwise. In other words, the phrase "based on" means both "based only on" and "based at least on".

As long as "include", "including", and variations thereof are used in the specification or claims, these terms are intended to be inclusive in a manner similar to the term "comprising". Furthermore, the term "or" used in the specification or claims is intended to be not an exclusive "or".

In the entirety of the present disclosure, articles, such as "a", "an", or "the" in English that are added to a noun term by translation may indicate a plurality of the noun terms unless the articles obviously indicate a singular noun from the context.

Note that in the embodiments of the present invention, the radio resource controller 140 is an example of a controller. PRB is an example of a physical resource block. ARFCN is an example of an index indicating a frequency.

The present invention has been described in detail above; it will be obvious to those skilled in the art that the present invention is not limited to the embodiments described herein. The present invention may be implemented as revised and modified embodiments without departing from the spirit and scope of the present invention as defined by the scope of the claims. Therefore, the present specification is described for the purpose of illustrating examples and does not have any restrictive meaning to the present invention.

DESCRIPTION OF REFERENCE SIGNS 100 base station device
200 user device
110 transmitter
120 receiver
130 configuration information manager
140 radio resource controller
1001 processor
1002 storage device
1003 auxiliary storage device
1004 communication device
1005 input device
1006 output device

The invention claimed is:

1. A second base station device communicating with a first base station device, the second base station device comprising:
   a receiver configured to receive, from the first base station device, an SGNB ADDITION REQUEST including first information for limiting radio resource allocation;
   a controller configured to allocate a radio resource based on the received first information for limiting radio resource allocation; and
   a transmitter configured to transmit an SGNB ADDITION REQUEST ACKNOWLEDGE including second information for limiting radio resource allocation to the first base station device,
   wherein each of the first information and the second information for limiting radio resource allocation includes information indicating at least one of a frequency domain and a time domain indicating a location of a radio resource.

2. The second base station device according to claim 1, wherein each of the first information and the second information for limiting radio resource allocation includes information indicating a frequency domain indicating a location of a radio resource, and
   wherein the information indicating the frequency domain includes a part of or all of
      a physical resource block to be potentially used by the first base station device or the second base station device for downlink or uplink,
      an index indicating a frequency, and
      a carrier band width.

3. The second base station device according to claim 1,
wherein in a case where the first base station device and the second base station device are synchronized, or a timing difference between the first base station device and the second base station device is acquired, each of the first information and the second information for limiting radio resource allocation includes information indicating a time domain indicating a location of a radio resource, and wherein the information indicating a time domain indicating a location of a radio resource includes a part of or all of a subframe or a slot to be potentially used for downlink or/and uplink, and a special subframe configuration.

4. The second base station device according to claim 1,
wherein in a case where the first base station device and the second base station device are asynchronous, and a timing difference between the first base station device and the second base station device is not acquired, each of the first information and the second information for limiting radio resource allocation includes information indicating a time domain indicating a location of a radio resource, and wherein the information indicating a time domain indicating a location of a radio resource includes information that indicates whether to start interference control.

5. The second base station device according to claim 1,
wherein each of the first information and the second information for limiting radio resource allocation includes information indicating a frequency domain indicating a location of a radio resource and information indicating a time domain indicating a location of a radio resource.

6. The second base station device according to claim 1,
wherein each of the first information and the second information for limiting radio resource allocation includes information indicating a frequency domain indicating a location of an unused radio resource and information indicating a time domain indicating a location of an unused radio resource.

* * * * *